US011747817B2

United States Patent
Uemura et al.

(10) Patent No.: US 11,747,817 B2
(45) Date of Patent: Sep. 5, 2023

(54) AUTONOMOUS TRAVELING WORK VEHICLE AND FIELD MANAGEMENT SYSTEM

(71) Applicant: Kubota Corporation, Osaka (JP)

(72) Inventors: Katsuhiko Uemura, Sakai (JP); Kanako Komori, Sakai (JP)

(73) Assignee: Kubota Corporation, Osaka (JP)

( * ) Notice: Subject to any disclaimer, the term of this patent is extended or adjusted under 35 U.S.C. 154(b) by 68 days.

(21) Appl. No.: 16/001,972

(22) Filed: Jun. 7, 2018

(65) Prior Publication Data
US 2019/0138020 A1 May 9, 2019

(30) Foreign Application Priority Data

Nov. 8, 2017 (JP) ................................ 2017-215252

(51) Int. Cl.
G05D 1/02 (2020.01)
G05D 1/00 (2006.01)
A01D 34/00 (2006.01)

(52) U.S. Cl.
CPC ........... G05D 1/0219 (2013.01); A01D 34/00 (2013.01); G05D 1/0044 (2013.01); G05D 1/0088 (2013.01); G05D 1/0274 (2013.01); G05D 2201/0201 (2013.01); G05D 2201/0208 (2013.01)

(58) Field of Classification Search
CPC .... A01D 34/00; A01D 34/008; G05D 1/0044; G05D 1/0088; G05D 1/0219; G05D 1/0274; G05D 2201/0201; G05D 2201/0208
See application file for complete search history.

(56) References Cited

U.S. PATENT DOCUMENTS

| 2005/0159841 A1* | 7/2005 | Yasukawa | G05D 1/0094 700/245 |
| 2007/0138864 A1* | 6/2007 | Fitton | B60T 8/3215 303/144 |
| 2007/0188615 A1* | 8/2007 | Beniyama | H04N 7/183 348/207.99 |

(Continued)

FOREIGN PATENT DOCUMENTS

| AU | 2015347785 B2 | 5/2016 |
| EP | 2286653 A2 | 6/2010 |

(Continued)

*Primary Examiner* — Hunter B Lonsberry
*Assistant Examiner* — Matthew J. Reda
(74) *Attorney, Agent, or Firm* — THE WEBB LAW FIRM

(57) ABSTRACT

An autonomous traveling work vehicle includes a traveling vehicle body, a positioning device mounted on the traveling vehicle body and configured to acquire self-vehicle position information indicative of a self-vehicle position, a work device for effecting a work for a field, a determining device for determining a condition of at least either one of the traveling vehicle body and the work device during traveling of the traveling vehicle body, an abnormality detection section for detecting abnormality in the field based on determination data determined by the determining device, and an abnormality information outputting section for outputting, as abnormality information, the self-position information in the case of detection of abnormality by the abnormality detection section.

2 Claims, 2 Drawing Sheets

(56) References Cited

U.S. PATENT DOCUMENTS

| | | | |
|---|---|---|---|
| 2008/0039974 A1* | 2/2008 | Sandin | G05D 1/0225 700/258 |
| 2012/0271502 A1* | 10/2012 | Lee | G05D 1/0274 701/26 |
| 2012/0323474 A1* | 12/2012 | Breed | B60W 30/16 701/117 |
| 2014/0324246 A1* | 10/2014 | Biber | G05D 1/0219 700/302 |
| 2015/0019043 A1* | 1/2015 | Creasey | G05D 1/0038 701/2 |
| 2015/0277442 A1* | 10/2015 | Ballou | G05D 1/0027 701/2 |
| 2016/0071418 A1* | 3/2016 | Oshida | G05D 1/0295 701/23 |
| 2016/0338262 A1* | 11/2016 | Liu | B08B 1/04 |
| 2017/0315552 A1* | 11/2017 | Matsuyama | H01Q 21/28 |
| 2018/0215393 A1* | 8/2018 | Miyakubo | G05D 1/0212 |
| 2019/0100218 A1* | 4/2019 | Kim | B60W 10/08 |

FOREIGN PATENT DOCUMENTS

| | | |
|---|---|---|
| JP | 2004108988 A | 4/2004 |
| JP | 2005215742 A | 8/2005 |
| JP | 201695661 A | 5/2016 |
| WO | 2016076320 A1 | 5/2016 |

* cited by examiner

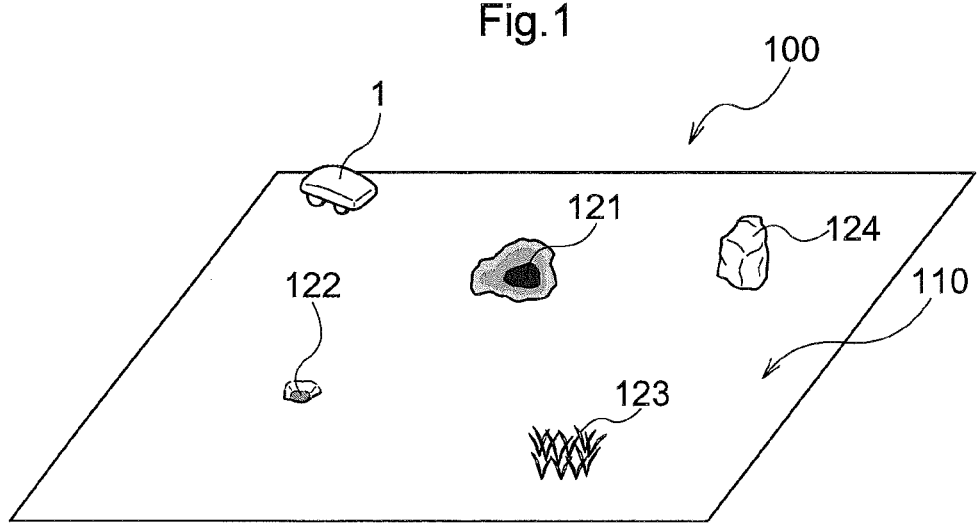
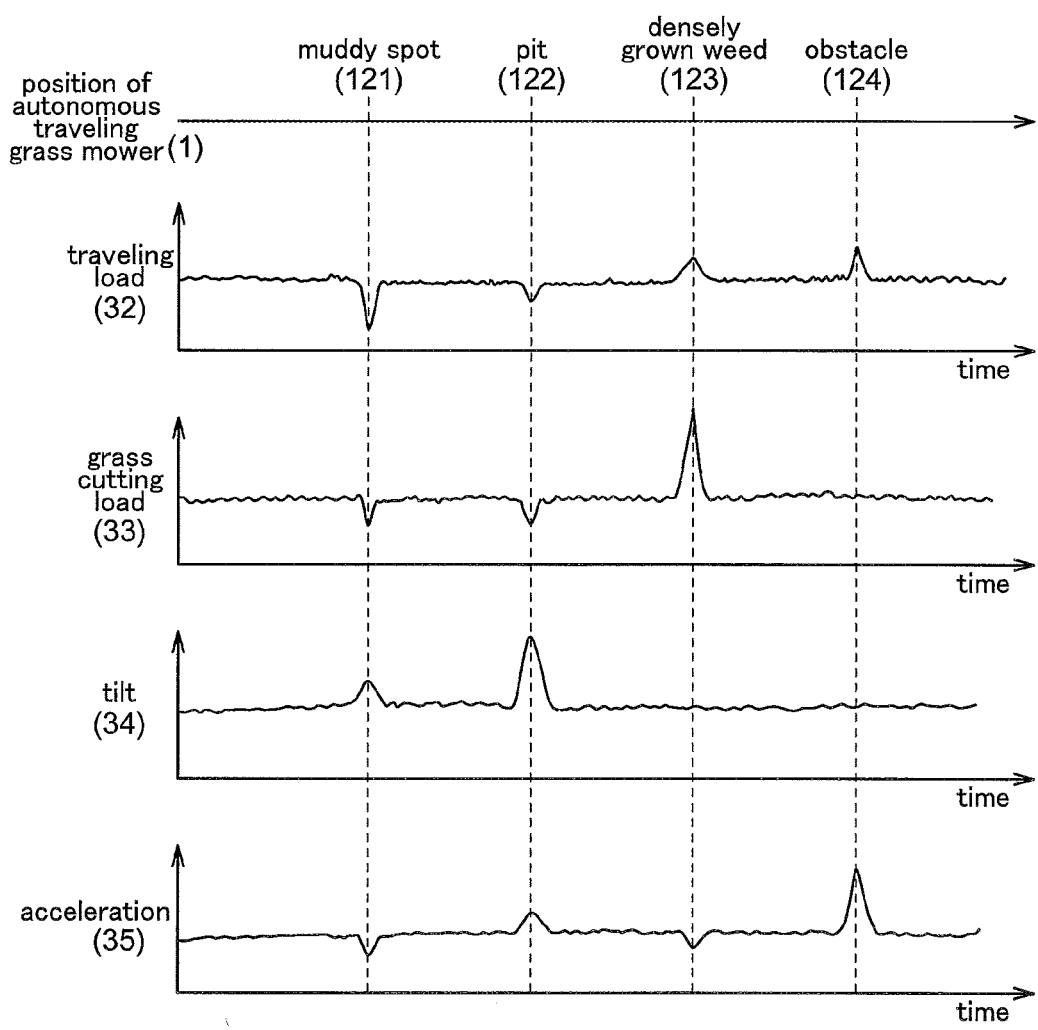

AUTONOMOUS TRAVELING WORK VEHICLE AND FIELD MANAGEMENT SYSTEM

CROSS-REFERENCE TO RELATED APPLICATION

This application claims priority to Japanese Patent Application No. 2017-215252 filed Nov. 8, 2017, the disclosure of which is hereby incorporated in its entirety by reference.

BACKGROUND OF THE INVENTION

1. Field of the Invention

The present invention relates to an autonomous traveling work vehicle and a field management system.

2. Description of Related Art

In recent years, there has been growing popularity of an autonomous traveling work vehicle that carries out maintenance of a field such as a garden, a park, etc. automatically. If field maintenance is carried out with using such autonomous traveling work vehicle, manpower saving or unmanned implementation of such maintenance is made possible. As a result, there may arise possibility of the managing person's failing to take notice of such defect as a pit, a muddy spot, a puddle, densely grown weed, growth of *Parthenocissus*, a foreign object, etc. in the field.

For instance, in the detailed disclosure of European Patent No. 2286653 (Patent Document 1), there is disclosed an autonomous grass mower having a photographing means and a ground surface sensor and capable of recognizing vegetation situation. This autonomous grass mower can determine a borderline of a work area of its own based on a photographed image and detection result of the sensor.

RELATED ART DOCUMENT

Patent Document

Patent Document 1: detailed disclosure of European Patent No. 2286653

SUMMARY OF THE INVENTION

Problem to be Solved by Invention

However, although the autonomous grass mower disclosed in Patent Document 1 is capable of recognizing a borderline of a work area of its own, it does not have any detecting means for such defect as a pit, a foreign object, etc. in the field, thus being insufficient in the respect of field maintenance.

Then, there is a need for realization of an autonomous traveling work vehicle capable of detecting field defect and reporting it to a managing person.

Solution

An autonomous traveling work vehicle relating to the present invention comprises:
a traveling vehicle body;
a positioning device mounted on the traveling vehicle body and configured to acquire self-vehicle position information indicative of a self-vehicle position;
a work device for effecting a work for a field;
a determining device for determining a condition of at least either one of the traveling vehicle body and the work device during traveling of the traveling vehicle body;
an abnormality detection section for detecting abnormality in the field based on determination data determined by the determining device; and
an abnormality information outputting section for outputting, as abnormality information, the self-position information in the case of detection of abnormality by the abnormality detection section.

Further, a field management system relating to the present invention comprises:
an autonomous traveling work vehicle including:
a traveling vehicle body;
a positioning device mounted on the traveling vehicle body and configured to acquire self-vehicle position information indicative of a self-vehicle position;
a work device for effecting a work for a field;
a determining device for determining a condition of at least either one of the traveling vehicle body and the work device during traveling of the traveling vehicle body;
an abnormality detection section for detecting abnormality in the field based on determination data determined by the determining device; and
an abnormality information outputting section for outputting, as abnormality information, the self-position information in the case of detection of abnormality by the abnormality detection section; and
a terminal including:
an abnormality information acquisition section for acquiring the abnormality information outputted from the abnormality information outputting section;
a map information storage section for storing map information of the field; and
an abnormality information addition section for adding the abnormality information to the map information.

With the above-described arrangement, a work is carried out by the autonomous traveling work vehicle and also it is possible to specify a location (spot) possibly having a defect and the managing person can detect such defect in the field.

Next, some preferred embodiments will be explained. It is understood however that the scope of the invention is not to be limited to the following preferred embodiments.

According to one preferred embodiment of the inventive autonomous traveling work vehicle, determination data determined by the determining device is at least one selected from the group consisting of a traveling load applied to a traveling drive device for driving the traveling vehicle body for traveling, a work load applied to a work drive device for driving the work device, a tilt of the traveling vehicle body, and an acceleration of the traveling vehicle body.

With the above-described arrangement, such defect as a pit, a muddy spot, a puddle, densely grown weed, growth of *Parthenocissus*, a foreign object, etc., can be detected.

According to one preferred embodiment of the inventive autonomous traveling work vehicle, the abnormality information includes the determination data acquired when the abnormality was detected.

With the above-described arrangement, it is possible to estimate contents of the abnormality based on the determination data.

According to one preferred embodiment of the inventive autonomous traveling work vehicle, the vehicle further comprises a photographing device for photographing an image around the traveling vehicle body when the abnormality has been detected by the abnormality detection section; and wherein the abnormality information includes an image photographed by the photographing device.

With the above-described arrangement, the current situation of a location where abnormality has been detected can be visually recognized, such that the managing person can readily determine need or no need for a measure to be taken therefor.

Further features and advantages of the present invention will become apparent upon reading the following explanation of exemplary and non-limiting embodiments with reference to the accompanying drawings.

BRIEF DESCRIPTION OF THE DRAWINGS

FIG. 1 is a schematic showing a first embodiment of an autonomous traveling work vehicle relating to the present invention, FIG. 2 is a schematic showing determination effected in the first embodiment of the autonomous traveling work vehicle relating to the present invention.

DETAILED DESCRIPTION OF PREFERRED EMBODIMENTS

First Embodiment

Figure 3:
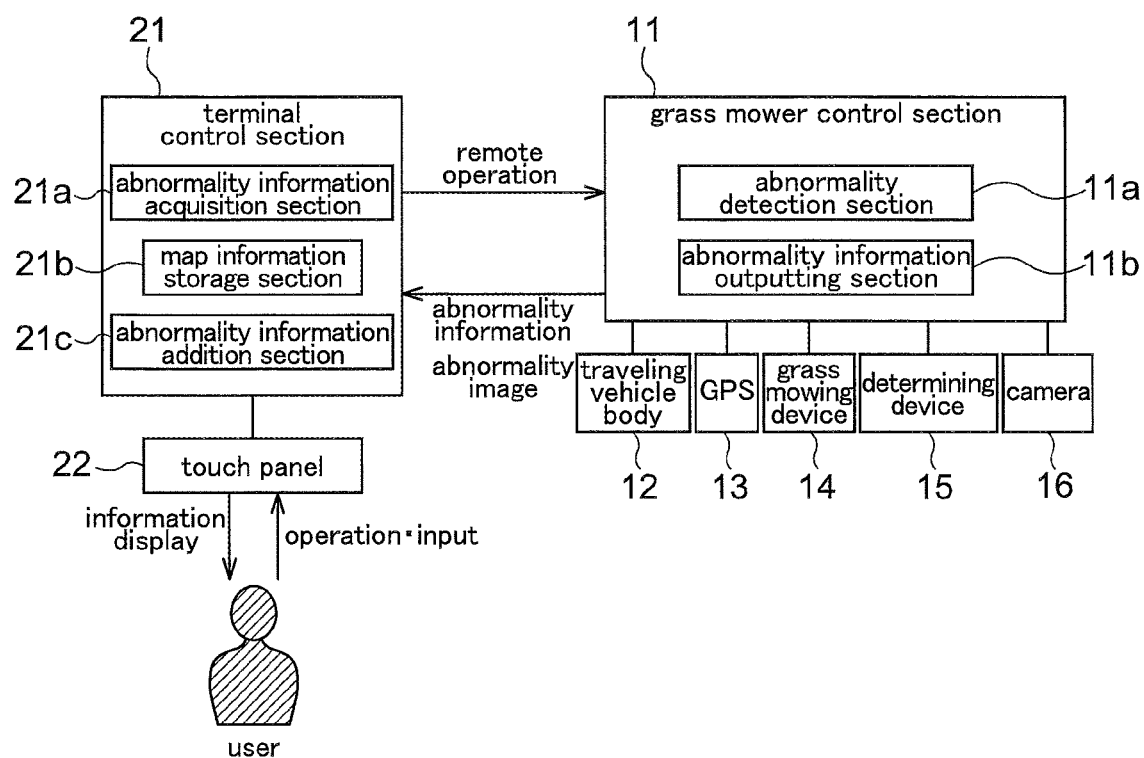
FIG. 3 is a diagram showing relationship among various constituting elements of a field management system including the first embodiment of the autonomous traveling work vehicle relating to the present invention.

Next, embodiments of an autonomous traveling work vehicle relating to the present invention will be described with reference to the accompanying drawings. In this embodiment, there will be explained an example in which the inventive autonomous traveling work vehicle is applied to an autonomous traveling grass mower 1. Incidentally, in the following discussion, a global positioning system will be referred to as "GPS".

The autonomous traveling grass mower 1 according to this embodiment carries out a grass cutting (mowing) work in a work area 110 predefined in a field 100. The autonomous traveling grass mower 1 includes a grass mower control section 11, a traveling vehicle body 12, a GPS 13 as a "positioning device", a grass mowing device 14 as a "work device", a determining device 15, and a camera 16 as a "photographing device". The grass mower control section 11 includes an abnormality detection section 11a and an abnormality information outputting section 11b.

The autonomous traveling grass mower 1 can effect wireless communication with a terminal 2. A user can remotely operate the autonomous traveling grass mower 1 by the terminal 2. The terminal 2 includes a terminal control section 21 and a touch panel 22. The terminal control section 21 includes an abnormality information acquisition section 21a, a map information storage section 21b and an abnormality information addition section 21c.

The GPS 13 determines (acquires) self-vehicle position information. The determining device 15 determines a traveling load 32 applied to a traveling drive device for driving the traveling vehicle body 12 for traveling, a grass cutting load 33 (an example of "work load") applied to a grass mower drive device for driving the grass mowing device 14, a tilt 34 (inclination) of the traveling vehicle body 12, and an acceleration 35 of the traveling vehicle body 12. The grass mower control section 11 incorporates a clock.

In the instant embodiment, there will be explained an exemplary case in which as "defects" in the field 100, there exist a muddy spot 121, a pit 122, densely grown weed 123, and an obstacle 124.

The autonomous traveling grass mower 1 which effects an autonomous work, continuously records self-vehicle position information, the traveling load 32, the grass cutting load 33, the tilt 34 and the acceleration 35. Such information as the self-vehicle position information are recorded together with a time acquired by the clock incorporated in the grass mower control section 11.

When the autonomous traveling grass mower 1 arrives at the muddy spot 121, there occurs racing in its wheel(s), thus a significant reduction occurs in the traveling load 32 as compared with the normal time. Then, the abnormality detection section 11a determines that a defect is present at this location and the camera 16 captures an image of the defect at this location. Further, the grass mower control section 11 records the time of this instant and the current position information as "defect information" and the abnormality information outputting section 11b transmits the defect information and the defect image to the abnormality information acquisition section 21a of the terminal 2.

When the autonomous traveling grass mower 1 arrives at the pit 122, the autonomous traveling grass mower 1 will be tilted, so there occurs significant change in the tilt 34 as compared with the normal time. Also, when the autonomous traveling grass mower 1 receives a shock in association with the tilting, there occurs a significant change in its acceleration 35 as compared with the normal time. Then, the abnormality detection section 11a determines that a defect is present at this location and the camera 16 captures an image of the defect at this location. Further, the grass mower control section 11 records the time of this instant and the current position information as "defect information" and the abnormality information outputting section 11b transmits the defect information and the defect image to the abnormality information acquisition section 21a of the terminal 2.

When the autonomous traveling grass mower 1 arrives at the densely grown weed 123, there occurs a significant rise in the grass cutting load 33 as compared with the normal time. Then, the abnormality detection section 11a determines that a defect is present at this location and the camera 16 captures an image of the defect at this location. Further, the grass mower control section 11 records the time of this instant and the current position information as "defect information" and the abnormality information outputting section 11b transmits the defect information and the defect image to the abnormality information acquisition section 21a of the terminal 2.

When the autonomous traveling grass mower 1 hits the obstacle 124, there occurs a significant change in its acceleration 35 as compared with the normal time. Then, the abnormality detection section 11a determines that a defect is present at this location and the camera 16 captures an image of the defect at this location. Further, the grass mower control section 11 records the time of this instant and the current position information as "defect information" and the abnormality information outputting section 11b transmits the defect information and the defect image to the abnormality information acquisition section 21a of the terminal 2.

When the work by the autonomous traveling grass mower 1 is completed, a map of the field 100 stored in the map information storage section 21b will be displayed on the touch panel 22 of the terminal 2. Subsequently, the abnormality information addition section 21c displays on this map, the defect location specified by the defect information.

When the user switches over the display screen by operating the touch panel 22, the defect image corresponding to the defect information will be displayed on the touch panel 22. Further, the traveling load 32, the grass cutting load 33, the tilt 34 and the acceleration 35 will also be displayed on the touch panel 22. Then, based on these information, the user can specify the location of the defect as well as the contents of the defect.

Further, since the defect image is recorded together with the determination data such as the traveling load 32, it is readily possible to determine whether such defect actually exists or not. For instance, based on recorded acceleration 35 alone, it is difficult to determine what the hit object (article) is. However, with checking the defect image also, it is easy to determine what the object is and it is possible to determine whether a measure should be taken therefor or not.

Other Embodiments

Lastly, other embodiments of methods of controlling the inventive autonomous traveling work vehicle will be explained. Incidentally, it is understood that the arrangements to be disclosed in the following respective embodiments can be used also in any desired combination with the arrangements disclosed in the other embodiments unless contradiction occurs.

In the foregoing embodiment, there was disclosed the exemplary arrangement in which the determining device 15 determines the traveling load 32 applied to a traveling drive device for driving the traveling vehicle body 12 for traveling, the grass cutting load 33 applied to a grass mower drive device for driving the grass mowing device 14, the tilt 34 of the traveling vehicle body 12, and the acceleration 35 of the traveling vehicle body 12. However, the invention is not limited thereto. For instance, the autonomous traveling work vehicle can determine a rotational speed of the wheels of the traveling vehicle body, a rotational speed of the work device, a traveling distance, an altitude, a hardness of ground surface, ambient sound, smell, etc.

In the foregoing embodiment, there was disclosed the exemplary arrangement in which the terminal 2 is provided with the touch panel 22. However, the invention is not limited thereto. For instance, the terminal may be provided with any desired input/output device. The terminal can be a dedicated terminal, or a general-purpose terminal such as a smartphone, a tablet terminal, a personal computer, etc.

The method of causing the autonomous traveling work vehicle to recognize a work area is not particularly limited. It can be a method of installing a border detecting means such as an area wire in advance, as known in the art or can be a method based on position information acquired by the positioning device.

In regards to the other arrangements too, it is understood that the embodiments disclosed in this detailed disclosure are only exemplary and the scope of the present invention is not limited thereto. It will be readily understood that one skilled in the art could make appropriate modifications therein within a range not departing from the essence of the present invention. Therefore, other embodiments including such modifications not departing from the essence of the present invention are construed to be encompassed within the claimed scope of the present invention, as a matter of course.

The invention claimed is:

1. A field management system comprising:
    an autonomous traveling work vehicle including:
        a traveling vehicle body;
        a positioning device mounted on the traveling vehicle body and configured to acquire self-vehicle position information indicative of a self-vehicle position;
        a work device configured to effect a work for a field;
        a set of sensors configured to determine determination data for use in abnormality detection based on a condition of at least one of the traveling vehicle body and the work device during traveling of the traveling vehicle body, wherein the determination data determined by the set of sensors is: a traveling load applied to a traveling drive device for driving the traveling vehicle body for traveling, a work load applied to a work drive device for driving the work device, a tilt of the traveling vehicle body, and an acceleration of the traveling vehicle body;
        an abnormality detection section configured to detect an abnormality in the field based on the determination data determined by the set of sensors;
        a photographing device configured to photograph an image around the traveling vehicle body in response to an abnormality being detected by the abnormality detection section; and
        an abnormality information outputting section configured to output, as abnormality information in the case of detection of abnormality by the abnormality detection section, the self-vehicle position information, the image photographed by the photographing device, and the determination data; and
    a terminal operated remotely from the autonomous traveling work vehicle including:
        an abnormality information acquisition section configured to acquire the abnormality information outputted from the abnormality information outputting section;
        a map information storage section configured to store map information of the field;
        an abnormality information addition section configured to add the abnormality information to the map information, the abnormality information including the self-vehicle position information, the image photographed by the photographing device, and the determination data; and
        a display section configured to display the abnormality information and the map information, the abnormality information including the self-vehicle position information, the image photographed by the photographing device, and the determination data, the display section being further configured to display the determination data on a graph, the graph comprising an x-axis representing a time period over which the determination data was determined, and a y-axis representing each recorded value of the determination data.

2. The system of claim 1, wherein the terminal is further programmed or configured to, in response to work for the field being completed by the autonomous traveling work vehicle:
    displaying, based on the abnormality information and the map information, a map of the field comprising a plurality of representations of detected abnormalities on the map; and
    displaying, based on user input to the terminal, the image around the traveling vehicle body that was photographed in response to detection of the abnormality.

* * * * *